United States Patent
Zou (10) Patent No.: US 9,746,841 B2
(45) Date of Patent: Aug. 29, 2017

(54) REDUCING PILOT RUNS OF RUN-TO-RUN CONTROL IN A MANUFACTURING FACILITY

(71) Applicant: Applied Materials, Inc., Santa Clara, CA (US)

(72) Inventor: Jianping Zou, Austin, TX (US)

(73) Assignee: Applied Materials, Inc., Santa Clara, CA (US)

( * ) Notice: Subject to any disclaimer, the term of this patent is extended or adjusted under 35 U.S.C. 154(b) by 634 days.

(21) Appl. No.: 14/268,418

(22) Filed: May 2, 2014

(65) Prior Publication Data
US 2015/0316916 A1 Nov. 5, 2015

(51) Int. Cl.
*G05B 13/02* (2006.01)
*G05B 17/02* (2006.01)
*H04L 29/08* (2006.01)

(52) U.S. Cl.
CPC .............. *G05B 17/02* (2013.01); *H04L 67/10* (2013.01)

(58) Field of Classification Search
None
See application file for complete search history.

(56) References Cited

U.S. PATENT DOCUMENTS

| 5,229,948 A * | 7/1993 | Wei ................. G05B 19/41885 700/99 |
| 6,725,098 B2 * | 4/2004 | Edwards .............. G05B 13/042 257/E21.525 |
| 2003/0078680 A1 * | 4/2003 | Edwards .............. G05B 13/042 700/29 |
| 2008/0188957 A1 * | 8/2008 | Cutler .................. G05B 13/041 700/39 |
| 2010/0191363 A1 * | 7/2010 | Zou .................. G05B 19/41835 700/121 |
| 2011/0060424 A1 * | 3/2011 | Havlena ............... G05B 13/048 700/29 |

OTHER PUBLICATIONS

Firth et al., "Just-in-time adaptive disturbance estimation for run-to-run control of semiconductor processes", : IEEE Transactions on Semiconductor Manufacturing ( vol. 19, Issue: 3, Aug. 2006 ).*

* cited by examiner

*Primary Examiner* — Philip Wang
(74) *Attorney, Agent, or Firm* — Lowenstein Sandler LLP (57) ABSTRACT

A system and method for reducing pilot runs of run-to-run control in a manufacturing facility calculates an unbiased estimation of an independent model intercept based on a state space model associated with the manufacturing facility. A determination is made as to whether to perform a pilot run in the manufacturing facility. Upon determining that the run is to be performed, an indication that the pilot run is to be performed is generated. Pilot run data is received in response to the pilot run being performed, and the state space model is updated based on the received data.

15 Claims, 6 Drawing Sheets

REDUCING PILOT RUNS OF RUN-TO-RUN CONTROL IN A MANUFACTURING FACILITY

TECHNICAL FIELD

Implementations of the present disclosure relate to a manufacturing facility, and more particularly, to reducing pilot runs of run-to-run control in a manufacturing facility.

BACKGROUND

In manufacturing facilities, pilot runs are performed to evaluate manufacturing processes performed by the manufacturing facility and/or tools in the manufacturing facility. Pilot runs may be required when new equipment is added to the manufacturing facility, when maintenance is performed on equipment in the manufacturing facility, when a new product is to be manufactured by the manufacturing facility, when a product has not been run in the manufacturing facility for a predefined period of time, etc.

When a manufacturing facility manufactures many products (e.g., hundreds of products), a large number of pilot runs may be required each time maintenance is performed, a new product or tool is added, or a product has not been run in a while. A traditional solution for reducing the number of pilot runs, which is used to evaluate manufacturing processes performed by the manufacturing facility or tools in the manufacturing facility, is grouping products and running a pilot run per group of products in order to minimize the number of pilot runs. However, this solution can affect the performance of the manufacturing facility because the manufacturing process or tools are adjusted for the group of products, rather than optimized for each product manufactured or tool used in the manufacturing facility. Another traditional solution uses historical data to estimate adjustment data for manufacturing processes or tools from the pilot runs. However, this solution may not provide accurate adjustment data.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" implementation in this disclosure are not necessarily to the same implementation, and such references mean at least one.

DETAILED DESCRIPTION

Run-to-run (R2R) control has been widely used in manufacturing for controlling various processes such as overlay, photo-resist processing, etching, chemical-mechanical-planarization (CMP) processes, or diffusion. R2R control refers to a process control in which a recipe with respect to a particular fabrication process is modified between runs to minimize the impacts of process drift. Inputs and outputs of each process run are taken into account by an R2R controller at the end of each run. With this feedback, the R2R controller is able to obtain an optimal recipe for the next run and thereby enhance the performance.

An effective way to implement an R2R control system is to use a process model. Most process models for R2R control are expressed as a linear relation between inputs and outputs. For example, the process model is a linear input/output model:

$y_{k+1} = bu_k + d_k$, where $y_k$ is a controlled output (e.g., settings to apply to future run k+1), $u_k$ is a controlled input (e.g., settings applied to a current or previous run k), b is a model slope, and $d_k$ is a model intercept (offset), or y-intercept, which can be a process disturbance.

The model intercept, $d_k$, is a measure of the amount of disturbance expected in the current or previous run performed in the manufacturing facility. A manufacturing process is usually associated with different contexts (e.g., different manufacturing tools, reticles, products, manufacturing layers, etc.) that represent components of the manufacturing process. Accordingly, the model intercept, $d_k$, used in the above expression depends upon the specific contexts associated with the manufacturing process and is obtained through experimentation. Most R2R control systems estimate intercept based on pilot runs. A pilot run refers to a test process performed on a wafer, through which an initial intercept estimation can be obtained. Therefore, pilot runs are performed to evaluate manufacturing processes performed by the manufacturing facility and/or tools in the manufacturing facility. The results from one or more pilot runs can be analyzed and used by an administrator (e.g., engineer) to determine if any further adjustments need to be made to the manufacturing processes or tools in the manufacturing facility due to unknown changes of the underlying process which impacts wafer processing. For example, a pilot run for a new product A evaluates the manufacturing process for product A and an administrator (e.g., engineer) can analyze the results of the pilot run to determine whether any adjustments to the manufacturing process or tools need to be made.

Pilot runs may be required to evaluate one or more manufacturing processes of the manufacturing facility when new equipment (e.g., a new tool) is added to the manufacturing facility, when maintenance is performed on equipment (e.g., a tool) in the manufacturing facility, when a new product is to be manufactured by the manufacturing facility, when a product has not been run in the manufacturing facility for a predefined period of time (e.g., one month, two months, three months, or longer), etc. The number of pilot runs that need to be performed by the manufacturing facility can depend on the reason that the pilot runs are required. When a new tool is added or tool maintenance is performed, the number of pilot runs performed by the manufacturing facility can be equal to the number of products whose manufacturing uses the tool. For example, if a manufacturing facility manufactures 20 products, and 10 of those products require the use of tool A in their manufacturing processes, then 10 pilot runs are required (one for each product) after maintenance is performed on tool A. When a new product is added to the manufacturing facility, the number of pilot runs performed by the manufacturing facility can be equal to the number of tools used to manufacture the product. For example, if the manufacturing process for product X uses tool A, tool B, and tool C, then 3 pilot runs are required (one for each tool) after product X is added to the manufacturing facility. When a product has not been run in the manufacturing facility for a predefined period of time, the number of pilot runs performed by the manufacturing facility can be equal to the number of tools used to manufacture the product. For example, if a product Y has not been run for 3 months, and the manufacturing process for product Y uses tool D, tool E, and tool F, then 3 pilot runs will be required (one for each tool) to restart the manufacture of product Y.

When a manufacturing facility manufactures many products (e.g., hundreds of products), a large number of pilot runs may be required to evaluate the processes in the manufacturing facility each time maintenance is performed, a new product or tool is added, or a product has not been run in a while. As described above, traditional solutions that reduce the number of pilot runs in a manufacturing facility used to evaluate manufacturing processes in the manufacturing facility can be inaccurate.

The model intercept (e.g., $d_k$) can depend on different contexts. A context can be a component in the manufacturing facility, such as a tool, a device, a layer in a wafer, a reticle, etc. Offsets from one or more of the contexts can drift during manufacturing. Because the model intercept can depend on different contexts, each model intercept can be represented as a summation of the different context offsets that affect the model intercept. For example, the model intercept can be represented as:

$$d_k = d_{k,1} + d_{k,2} + \ldots + d_{k,n}, \text{ where n is the number of contexts.}$$

Therefore, for a specific run, a model intercept can be based on the specific values for each of the contexts. For example, if the model intercept depends on tool, device, layer, and reticle, then the number of contexts is 4, and the each model intercept is represented as:

$$d_k = d_{k,tool} + d_{k,device} + d_{k,layer} + d_{k,reticle}.$$

There can be multiple values for each of the model intercepts for the manufacturing facility based on the number of contexts in the manufacturing facility. For example, if the manufacturing facility has $n_1$ context values in context 1, $n_2$ context values in context 2, . . . and $n_n$ context values in context n, there are total of $n_1 + n_2 + \ldots + n_n$ independent context offsets in the manufacturing facility, and ($n_1 \times n_2 \times \ldots \times n_n$) runs with different context value combinations. Therefore, if there are $n_1, n_2, \ldots, n_n$ context values for context 1, 2, . . . n, there will be total of ($n_1 \times n_2 \times \ldots \times n_n$) model intercepts, with $$\sum_{i=1}^{n} n_i - n + 1$$

of the model intercepts being independent in the manufacturing facility, and all other model intercepts can be expressed as linear combinations of these independent model intercepts.

Every context offset can drift independently. For example, if one tool (tool_001), one device (d_001), two layers (L_001 and L_002), and two reticles (r_001 and r_002) are in the manufacturing facility, there will be four (1×1×2×2) model intercepts ($d_k$) in which $d_{k,tool\_001}$, $d_{k,d\_001}$, $d_{k,L\_001}$, $d_{k,L\_002}$, $d_{k,r\_001}$, and $d_{k,r\_002}$ may drift independently:

$$d_{k,1} = d_{k,tool\_001} + d_{k,d\_001} + d_{k,L\_001} + d_{k,r\_001}$$

$$d_{k,2} = d_{k,tool\_001} + d_{k,d\_001} + d_{k,L\_002} + d_{k,r\_001},$$

$$d_{k,3} = d_{k,tool\_001} + d_{k,d\_001} + d_{k,L\_001} + d_{k,r\_002}$$

$$d_{k,4} = d_{k,tool\_001} + d_{k,d\_001} + d_{k,L\_002} + d_{k,r\_002}$$

and the independent model offset are $$d_{k,1} = d_{k,tool\_001} + d_{k,d\_001} + d_{k,L\_001} + d_{k,r\_001}$$

$$d_{k,2} = d_{k,tool\_001} + d_{k,d\_001} + d_{k,L\_002} + d_{k,r\_001},$$

$$d_{k,3} = d_{k,tool\_001} + d_{k,d\_001} + d_{k,L\_001} + d_{k,r\_002}$$

since the $4^{th}$ intercept can be expressed as linear combination of the above independent intercepts:

$$d_{k,4} = d_{k,2} - d_{k,1} d_{k,3}.$$

In the above example, 4 pilot runs can be used to determine a value of each model intercept ($d_{k,1}$, $d_{k,2}$, $d_{k,3}$, $d_{k,4}$) after maintenance of tool_001. However, using a pilot run to determine each model intercept may require a large number of pilot runs to be performed in a manufacturing facility. In order to reduce the number of pilot runs that need to be performed, non-threaded control can be used to estimate the context offset that makes up each model intercept. Using the above example, if each value of the model intercept is separated into multiple context offsets $d_{k,tool\_001}$, $d_{k,d\_001}$, $d_{k,L\_001}$, $d_{k,L002}$, $d_{k,r\_001}$, and $d_{k,r\_002}$, then after maintenance of tool_001, a single pilot run can be used to determine the new value(s) of $d_{k,tool\_001}$ because the remaining context offsets have not changed. New model intercepts after maintenance can be calculated from the summation of context offsets (using the above equations for each model intercept). However, context offsets may be unobservable, and estimation of context offsets may be biased.

Some of the model intercepts may be independent of each other (i.e., independent variables in the process model for R2R control). These independent model intercepts may not depend on any of the other of the model intercepts. To have unbiased estimation, estimation of the independent model intercepts can be performed instead of estimating the context offsets.

If the model intercept is a summation of context offsets, pilot runs may be used to determine the changed context offset in the model. For example, the model intercept is the summation of offset from tool, device, layer and reticle. In this example, if tool maintenance is performed in the manufacturing facility, only the tool offset is affected by the tool maintenance, while the other context offsets, such as the device, layer, reticle, are not affected. Therefore, there is no need to perform a pilot run for each of the contexts (tool, device, layer, and reticle) and instead, only a pilot run for the tool context needs to be performed.

Embodiments of the present disclosure reduce the number of pilot runs in a manufacturing facility. To reduce the number of pilot runs, an embodiment of the present disclosure determines a plurality of model intercepts based on a process model associated with the manufacturing facility, calculates an unbiased estimation of each of a plurality of model intercepts based on the plurality of model intercepts associated with the process model, determines whether to perform a pilot run based on the unbiased estimation of the plurality of model intercepts, and upon determining to perform the pilot run, updates the plurality of model intercepts based on the pilot run.

Figure 1:
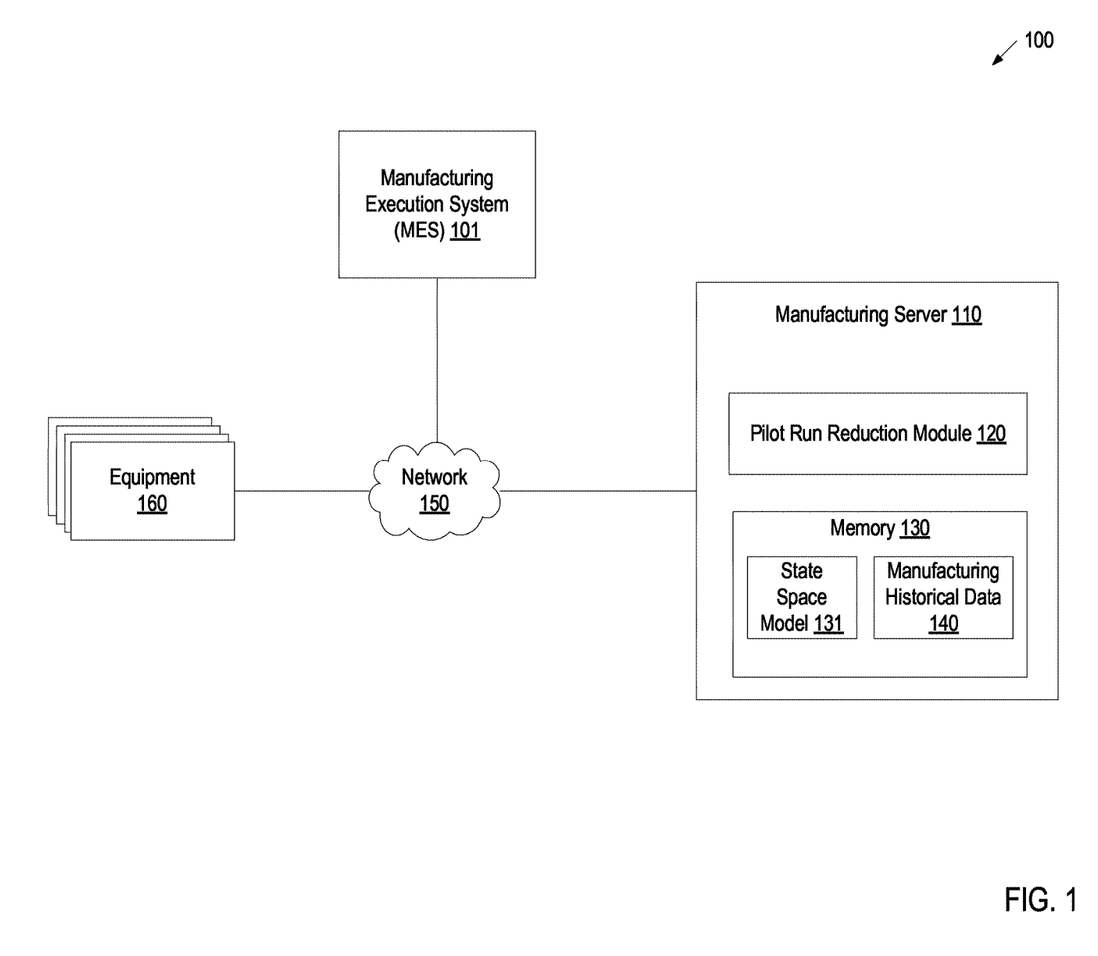
FIG. 1 is a block diagram illustrating a manufacturing system utilizing a pilot run reduction module.

FIG. 1 is a block diagram illustrating a manufacturing system 100 including a manufacturing execution system (MES) 101, a manufacturing server 110, and equipment 160 (e.g. manufacturing tools and devices), each configured to communicate via a network 150. The network 150 can be a local area network (LAN), a wireless network, a mobile communications network, a wide area network (WAN), such as the Internet, or similar communication system.

The MES 101 and manufacturing server 110 can be any type of computing device including server computers, gateway computers, desktop computers, laptop computers, tablet computers, notebook computers, personal digital assistants (PDAs), mobile communications devices, cell phones, smart phones, hand-held computers, or similar computing devices. Alternatively, any combination of the functionality of MES 101 and manufacturing server 110 can be implemented on a single computing device including server computers, gateway computers, desktop computers, laptop computers, mobile communications devices, cell phones, smart phones, hand-held computers, or similar computing devices.

The manufacturing server 110 can collect and analyze data relating to equipment 160 including previous pilot runs, calibrations, maintenance, frequency of use, etc. Manufacturing historical data 140 relating to previous runs, calibrations, equipment use frequency, and maintenance may be stored in memory 130. Information and parameters of the state space model 131 may also be stored in memory 130. In one implementation, the manufacturing server 110 is coupled to an MES 101 to receive equipment information or transmit information indicating whether or not a pilot run should be performed. In turn, MES 101 may facilitate the execution of the pilot run by instruction equipment 160 accordingly. Manufacturing server 110 may also transmit instructions directly to equipment 160. The manufacturing server 110 can include a pilot run reduction module 120 to use real-time data and historical data relating to equipment 160 to determine whether to perform one or more pilot runs for each of equipment 160 based in part on the state space model 131 and manufacturing historical data 140 from memory 130. The pilot run reduction module 120 can provide an indication that a pilot run is to be performed to an operator of manufacturing system 100 (e.g., process engineer, system engineer, industrial engineer, system administrator, etc.) and/or MES 101, which in turn relays the instructions to equipment 160.

Figure 2:
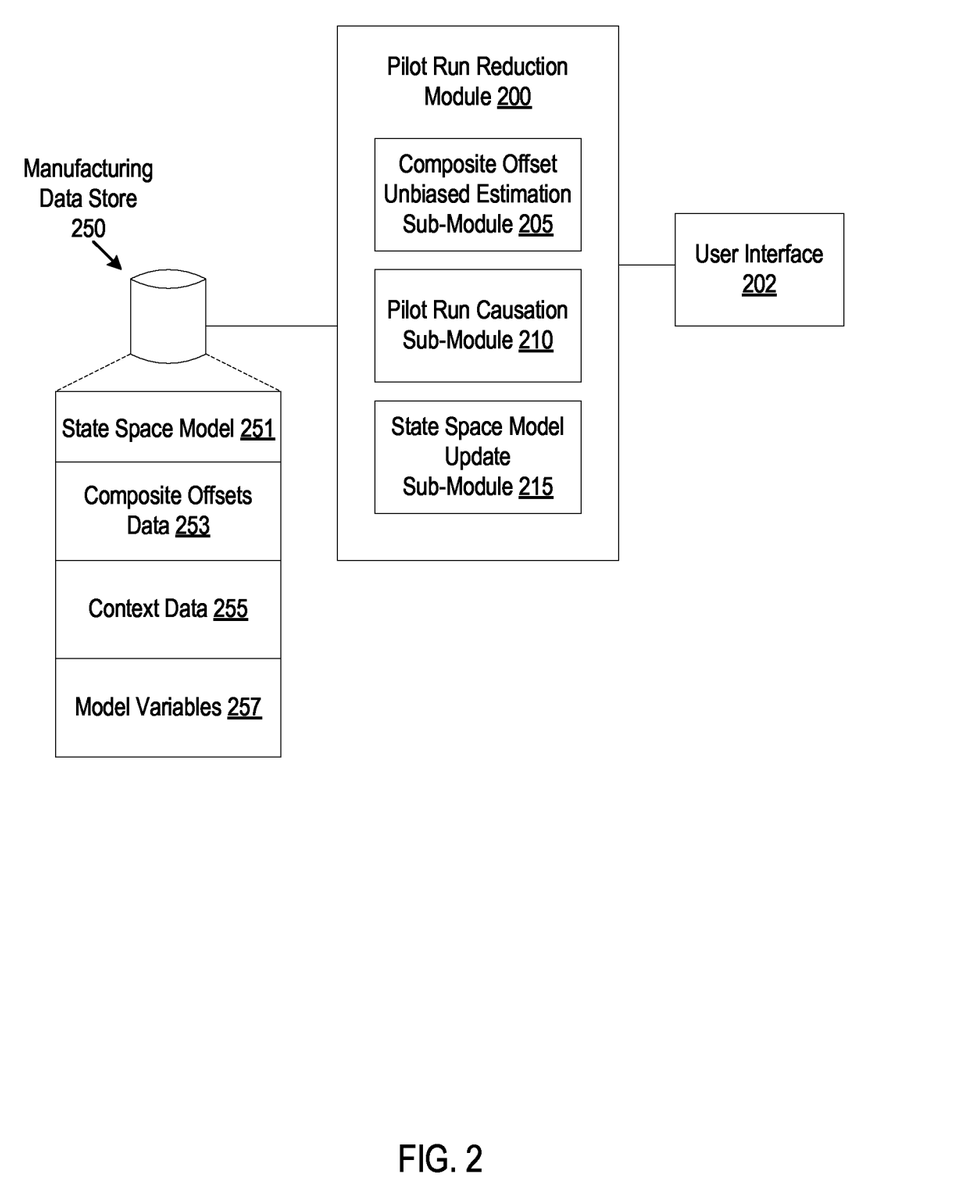
FIG. 2 a block diagram of one implementation of a pilot run reduction module.

FIG. 2 is a block diagram of one implementation of a pilot run reduction module 200. In one implementation, the pilot run reduction module 200 can be the same as the pilot run reduction module 120 of FIG. 1. The pilot run reduction module 200 can include a model intercept unbiased estimation sub-module 205, a pilot run causation sub-module 210, and a state space model update sub-module 215. Pilot run reduction module 120 is illustrated as being implemented on manufacturing server 110, but may also be implemented on any type of computing device, and may also be a standalone module separate from manufacturing server 110. In one embodiment, pilot run reduction module is implemented by a remotely located service provider as a contract service that utilizes manufacturing data of the manufacturing system 100.

The pilot run reduction module 200 can be coupled to one or more data stores, such as manufacturing data store 250. In one implementation, the manufacturing data store 250 can be the same as memory 130 of FIG. 1, and/or include state space module 251, composite offset data 253, context data 255, and model variables 257. The manufacturing data store 250 can be a persistent storage unit. A persistent storage unit can be a local storage unit or a remote storage unit. Persistent storage units can be a magnetic storage unit, optical storage unit, solid state storage unit, electronic storage unit (main memory) or similar storage unit. Persistent storage units can be a monolithic device or a distributed set of devices. The manufacturing data store 250 may be maintained on any device available via the network 150. For example, the manufacturing data store 250 may be maintained on a server computer, gateway computer, desktop computer, laptop computer, mobile communications device, cell phone, smart phone, hand-held computer, or similar computing device. Pilot run reduction module 200 may provide data to a user via a user interface 202. The user interface 202 can be a graphical user interface (GUI) implemented on any suitable device. For example, the GUI may be implemented on a different device than manufacturing server 110. In one implementation, an operator or administrator may use the user interface 202 to adjust parameters of the state space model 251 and manually input information pertaining to equipment 160.

Figure 3:
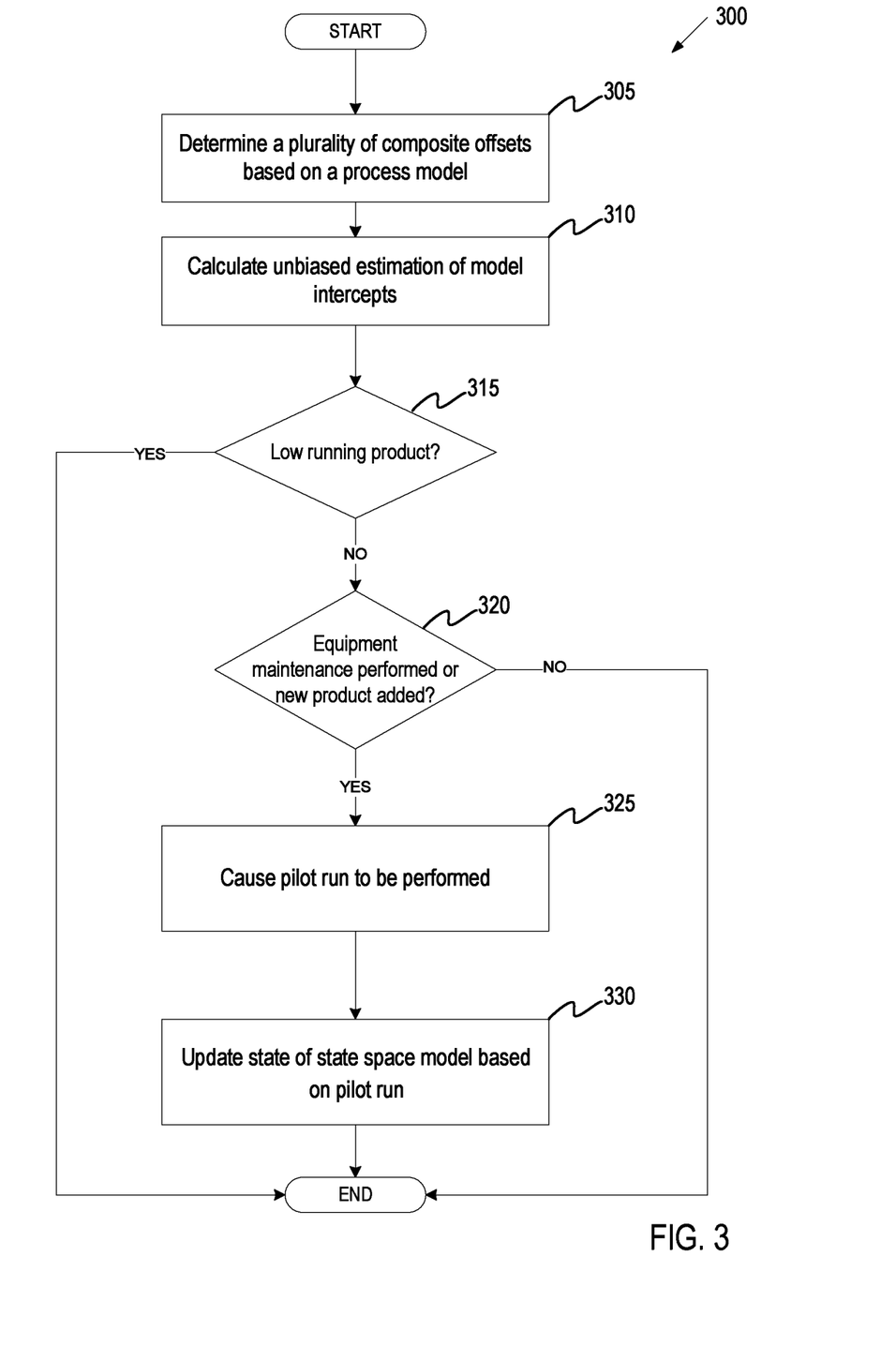
FIG. 3 illustrates one implementation of a method for reducing pilot runs of run-to-run control in a manufacturing facility.

FIG. 3 is a flow diagram illustrating one implementation of a method 300 for reducing pilot runs of R2R control in a manufacturing facility. Method 300 can be performed by processing logic that can comprise hardware (e.g., circuitry, dedicated logic, programmable logic, microcode, etc.), software (e.g., instructions run on a processing device), or a combination thereof. In one implementation, method 300 is performed by the pilot run reduction module 120 of manufacturing server 110 of FIG. 1.

At block 305, processing logic determines a plurality of model intercepts based on a process model associated with the manufacturing facility. Each model intercept can represent a linear combination of independent model intercepts in the process model. Processing logic can determine the plurality of model intercepts by defining a number of independent model intercepts required by the manufacturing facility and realizing the independent model intercepts as combinations of the context offsets associated with the process model.

Processing logic can determine the number of independent model intercepts based on a number of contexts and context values in the manufacturing facility. For example, the number of independent model intercepts is:

$$\sum_{i=1}^{n} n_i - n + 1,$$

where n is the number of contexts in the manufacturing facility, and $n_i$ is the number of values of context i.

For example, if the model intercept depends on tool, device, layer, and reticle, then the number of contexts is 4, and the each model intercept is represented as:

$$d_k = d_{k,tool} + d_{k,device} + d_{k,layer} + d_{k,reticle}.$$

There can be multiple values of the model intercepts for the manufacturing facility based on the number of contexts in the manufacturing facility. For example, if the manufacturing facility has $n_1$ context values in context 1, $n_2$ context values in context 2, . . . and $n_n$ context values in context n, there are total of $n_1+n_2+ \ldots +n_n$ independent context offsets in the manufacturing facility, and $(n_1 \times n_2 \times \ldots \times n_n)$ runs with different context value combinations. Therefore, if there are $n_1, n_2, \ldots, n_n$ context values for context $1, 2, \ldots n$, there will be total of $(n_1 \times n_2 \times \ldots \times n_n)$ model intercepts, with $$\sum_{i=1}^{n} n_i - n + 1$$

of the model intercepts being independent in the manufacturing facility, and all other model intercepts can be expressed as linear combinations of these independent model intercepts.

Every context offset can drift independently. For example, there is one tool (tool_001), one device (d_001), two layers (L_001 and L_002), and two reticles (r_001 and r_002) in the manufacturing facility. In this example, there will be four (1×1×2×2) model intercepts ($d_k$) in which 6 (1 tool+1 device+2 layers+2 reticles=6) context offsets ($d_{k,tool\_001}$, $d_{k,d\_001}$, $d_{k,L\_001}$, $d_{k,L\_002}$, $d_{k,r\_001}$, and $d_{k,r\_002}$) may drift independently:

$$d_{k,1} = d_{k,tool\_001} + d_{k,d\_001} + d_{k,L\_001} + d_{k,r\_001}$$

$$d_{k,2} = d_{k,tool\_001} + d_{k,d\_001} + d_{k,L\_002} + d_{k,r\_001},$$

$$d_{k,3} = d_{k,tool\_001} + d_{k,d\_001} + d_{k,L\_001} + d_{k,r\_002}$$

$$d_{k,4} = d_{k,tool\_001} + d_{k,d\_001} + d_{k,L\_002} + d_{k,r\_002}$$

and the independent model intercepts are $$d_{k,1} = d_{k,tool\_001} + d_{k,d\_001} + d_{k,L\_001} + d_{k,r\_001}$$

$$d_{k,2} = d_{k,tool\_001} + d_{k,d\_001} + d_{k,L\_002} + d_{k,r\_001},$$

$$d_{k,3} = d_{k,tool\_001} + d_{k,d\_001} + d_{k,L\_001} + d_{k,r\_002}$$

since the 4$^{th}$ intercept can be expressed as linear combination of the above intercepts $$d_{k,4} = d_{k,2} - d_{k,1} + d_{k,3}.$$

In the above example, the number of independent model intercepts will be 3.

At block 310, processing logic calculates an unbiased estimation of each of the model intercepts based on the independent model intercepts associated with the process model. The model intercepts can be a linear combination of the independent model intercepts associated with the process model.

Processing logic can calculate the unbiased estimation of each of the independent model intercepts by first solving the moving horizon estimation (MHE) of a state space model which describes a manufacturing process:

$$J = \min_{w_{k-M-1},\ldots,w_{k-1}} \left\{ w'_{k-M-1} R_{k-M}^{-1} w_{k-M-1} + \sum_{j=k-M}^{k-1} w'_j R^{-1} w_j + \sum_{j=k-N}^{k} v'_j Q^{-1} v_j \right\}$$

s.t.

$$\hat{x}_{j+1} = A\hat{x}_j + F_j w_j$$

$$v_j = \bar{y}_j - C_j \hat{x}_j$$

$$j = k - M - 1, k - M, \ldots, k.$$

Processing logic can represent each of the independent model intercepts as a linear combination of the context offsets. Processing logic can estimate the drift of the independent model intercepts based on the state space model of the manufacturing system. The state space model is a mathematical model of the manufacturing facility using a set of input, output, and state variables related by first-order differential equations. For example, the state space model for the manufacturing facility takes a form of:

$$x_{k+1} = x_k + F w_k$$

$$y_k = C_k u_k, \text{ where}$$

$x_k$ is a states represented independent model offset,
A, F, and C are model coefficient matrices,
R and Q are tuning parameters of the MHE equation,
$u_k$ is a controlled input,
$w_k$ is state noise that represents drift of model offsets, and
$y_k$ is a controlled output.

In one example, the state space mode for a manufacturing facility is:

$$\begin{bmatrix} x_{1,k+1} \\ x_{2,k+1} \\ x_{3,k+1} \end{bmatrix} = \begin{bmatrix} x_{1,k} \\ x_{2,k} \\ x_{3,k} \end{bmatrix} + \begin{bmatrix} 1 & 1 & 1 & 0 & 1 & 0 \\ 1 & 1 & 0 & 1 & 1 & 0 \\ 1 & 1 & 1 & 0 & 0 & 1 \end{bmatrix} w_k, \text{ where } y_k = C_k \begin{bmatrix} x_{1,k} \\ x_{2,k} \\ x_{3,k} \end{bmatrix}$$

$x_{1,k}$, $x_{2,k}$, and $x_{3,k}$ are the independent model offsets of $d_{k,1}$, $d_{k,2}$, and $d_{k,3}$, respectively,
b is the model slope,
$u_k$ is the controlled input, and
$w_k$ is a vector represents variations of all context offsets in the system.

Specifically, $w_k$ contains 6 elements represented variations of context offset for tool_001, d_001, L_001, L_002, r _001, and r_002, respectively.

Processing logic can request a number of runs to be performed in the manufacturing facility based on an observability matrix associated with the state space model. The observability matrix can be a property of the state space model for the manufacturing facility and can provide a guideline of the number of pilot runs required in the manufacturing facility in order to obtain an unbiased estimation of the independent model intercepts. The number of runs required can be based on the full column rank of the observability matrix. The observability matrix can have a full column rank when the rank of the observability matrix is equal to the number of columns of the matrix. For example, the observability matrix is:

$$M = \begin{bmatrix} C_k \\ C_{k+1} \\ \vdots \\ C_{k+n} \end{bmatrix}.$$

$C_k$ can be selected from the group of vectors based on a linear combination of the independent model intercepts and by a manufacturing run. For example, $C_k$ is selected based on:

$$\begin{bmatrix} d_{k,1} \\ d_{k,2} \\ d_{k,3} \\ d_{k,4} \end{bmatrix} = \begin{bmatrix} 1 & 0 & 0 \\ 0 & 1 & 0 \\ 0 & 0 & 1 \\ -1 & 1 & 1 \end{bmatrix} \begin{bmatrix} x_{k,1} \\ x_{k,2} \\ x_{k,3} \end{bmatrix},$$

and $C_k = \{[1\ 0\ 0], [0\ 1\ 0], [0\ 0\ 1], [-1\ 1\ 1]\}.$

In the above example, processing logic will determine that the full column rank of the observability matrix is 3 because the number of columns in the observability matrix M is 3. Therefore, in this example, the runs to determine unbiased estimation of model intercepts could be:

run_1: tool_001/d_001/L_001/r_001 ($C_1 = [\,1\ \ 0\ \ 0\,]$)

run_2: tool_001/d_001/L_002/r_001 ($C_2 = [\,0\ \ 1\ \ 0\,]$)

run_3: tool_001/d_001/L_001/r_002 ($C_3 = [\,0\ \ 0\ \ 1\,]$)

$$M = \begin{bmatrix} 1 & 0 & 0 \\ 0 & 1 & 0 \\ 0 & 0 & 1 \end{bmatrix}.$$

Processing logic can cause the number of runs be performed in the manufacturing facility and determine the unbiased estimation of the independent model intercepts based on the runs. In one embodiment, processing logic may generate an indication that one or more runs should be performed by, for example, transmitting a control signal to the MES 101 or to the equipment 160 directly via the network 150.

At block 315, processing logic determines whether the manufacturing facility is manufacturing a low running product. A low running product can be a product that has not been run in the manufacturing facility for a predefined period of time. The predefined period of time can be selected by a process engineer, an administrator, etc. For example, if the predefined period of time is 3 months, and product A has not been manufactured in the manufacturing facility for 4 months, then product A is considered a low running product. Processing logic determines whether the manufacturing facility is manufacturing a low running product by accessing a current product history for the manufacturing facility and determining if any of the products in the current product history have not been run for a predefined period of time (e.g., manufacturing historical data 140). If processing logic determines that the manufacturing facility is manufacturing a low running product, the method 300 ends because no additional pilot runs are required for a low running product. This is based on the fact that once the observability matrix becomes full column rank, it will keep full column rank for all future runs in the manufacturing facility as long as the process disturbances are kept as assumed in the state space model of the manufacturing facility. If processing logic determines that the manufacturing facility is not manufacturing a low running product, the method 300 proceeds to block 320.

At block 320, processing logic determines whether equipment maintenance was performed in the manufacturing facility or whether a new product was added to the manufacturing facility. Processing logic can determine whether equipment maintenance was performed in the manufacturing facility by determining if new maintenance has been performed on one or more tools in the manufacturing facility (e.g., by receiving maintenance events, etc.). Processing logic can determine whether a new product was added by checking if the product history for the manufacturing facility includes a new product (e.g., manufacturing historical data 140). If processing logic determines that no equipment maintenance was performed in the manufacturing facility and/or that no new product has been added, the method 300 ends because no additional pilot runs are required for the manufacturing facility. If processing logic determines that equipment maintenance has been performed in the manufacturing facility and/or a new product has been added, the method 300 proceeds to block 325.

At block 325, processing logic causes a pilot run to be performed in the manufacturing facility. Processing logic can request a pilot run to be performed by sending a signal to the manufacturing facility to perform a pilot run (e.g., by sending a signal from the manufacturing server 110 to the MES 101). By running the pilot run in the manufacturing facility, processing logic can execute the state of space model for the manufacturing facility to update the states (the independent model offsets) based on data produced by the pilot run. For example, the updates to the states may be stored in the memory 130 with the state space model 131.

At block 330, processing logic updates the state of the state space model associated with the manufacturing facility based on the pilot run. One embodiment of updating the state of the state space model if the pilot run is performed after equipment maintenance has been performed is described below with reference to FIG. 4. One embodiment of updating the state of the state space model if the pilot run is performed after a new product is added is described below with reference to FIG. 5.

Figure 4:
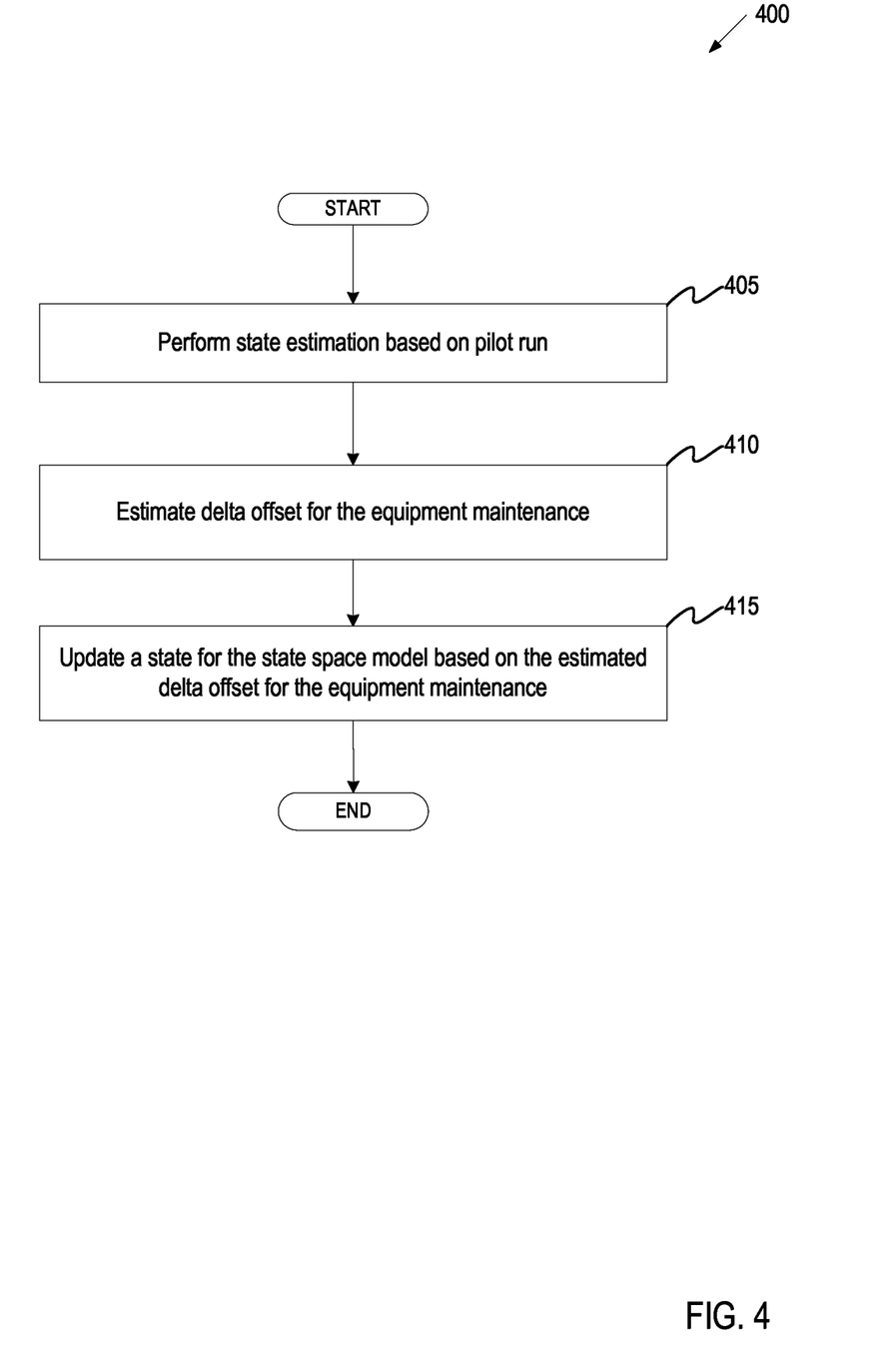
FIG. 4 illustrates one implementation of a method for updating a state space model based on a pilot run performed after an equipment update in a manufacturing facility.

FIG. 4 is a flow diagram illustrating one implementation of a method 400 for updating the state of state space model based on a pilot run performed after equipment maintenance has been performed. Method 400 can be performed by processing logic that can comprise hardware (e.g., circuitry, dedicated logic, programmable logic, microcode, etc.), software (e.g., instructions run on a processing device), or a combination thereof. In one implementation, method 400 is performed by the pilot run reduction module 120 of manufacturing server 110 of FIG. 1.

At block 405, processing logic performs a state estimation based on the pilot run. The state estimation can be an estimation of the independent model intercepts after the pilot run. In one embodiment, processing logic performs the state estimation based on the pilot run by obtaining the estimated independent model intercepts from the state space model that was updated after the pilot run.

At block 410, processing logic estimates a delta offset for the equipment maintenance. In one embodiment, processing logic estimates the delta offset for the equipment maintenance by determining the difference between the each independent model intercept before the equipment maintenance was performed and after the equipment maintenance was performed. For example, processing logic estimates the delta offset for the equipment maintenance using the equation:

$\Delta \hat{d}_k = \hat{y}_k - \hat{y}_{k-1} = C_k \hat{x}_k - C_{k-1} \hat{x}_{k-1}$, where $\hat{x}_k$ is the estimated independent model intercept, and
$\hat{y}_k = C_k \hat{x}_k$.

At block 415, processing logic updates all states for the state space model based on the estimated delta offset for the equipment maintenance. Processing logic can update the states for the space state model by determining the states in the state space model that were affected by the equipment maintenance and summing the delta offset for each state affected by the equipment maintenance. For example, for a manufacturing facility that performed equipment maintenance on tool_001, a state space model of:

$$\begin{bmatrix} x_{1,k+1} \\ x_{2,k+1} \\ x_{3,k+1} \end{bmatrix} = \begin{bmatrix} x_{1,k} \\ x_{2,k} \\ x_{3,k} \end{bmatrix} + \begin{bmatrix} 1 & 1 & 1 & 0 & 1 & 0 \\ 1 & 1 & 0 & 1 & 1 & 0 \\ 1 & 1 & 1 & 0 & 0 & 1 \end{bmatrix} w_k,\ y_k = C_k \begin{bmatrix} x_{1,k} \\ x_{2,k} \\ x_{3,k} \end{bmatrix},$$

with states $x_1$, $x_2$, and $x_3$ affected by the equipment maintenance. In this example, because states $x_1$, $x_2$, and $x_3$ depended on tool_001, the states $x_1$, $x_2$, and $x_3$ will need to be updated based on the estimated delta offset of the equipment maintenance. Therefore, in this example, the new estimated states after equipment maintenance will be:

$$\hat{x}_{1,k} = \hat{x}_{1,k-1} + \Delta\hat{d}_k$$

$$\hat{x}_{2,k} = \hat{x}_{2,k-1} + \Delta\hat{d}_k.$$

$$\hat{x}_{3,k} = \hat{x}_{3,k-1} + \Delta\hat{d}_k$$

Processing logic can update the state for the state space model based on the estimated delta offset for the equipment maintenance using alternate computations without departing from the scope of the present disclosure.

Figure 5:
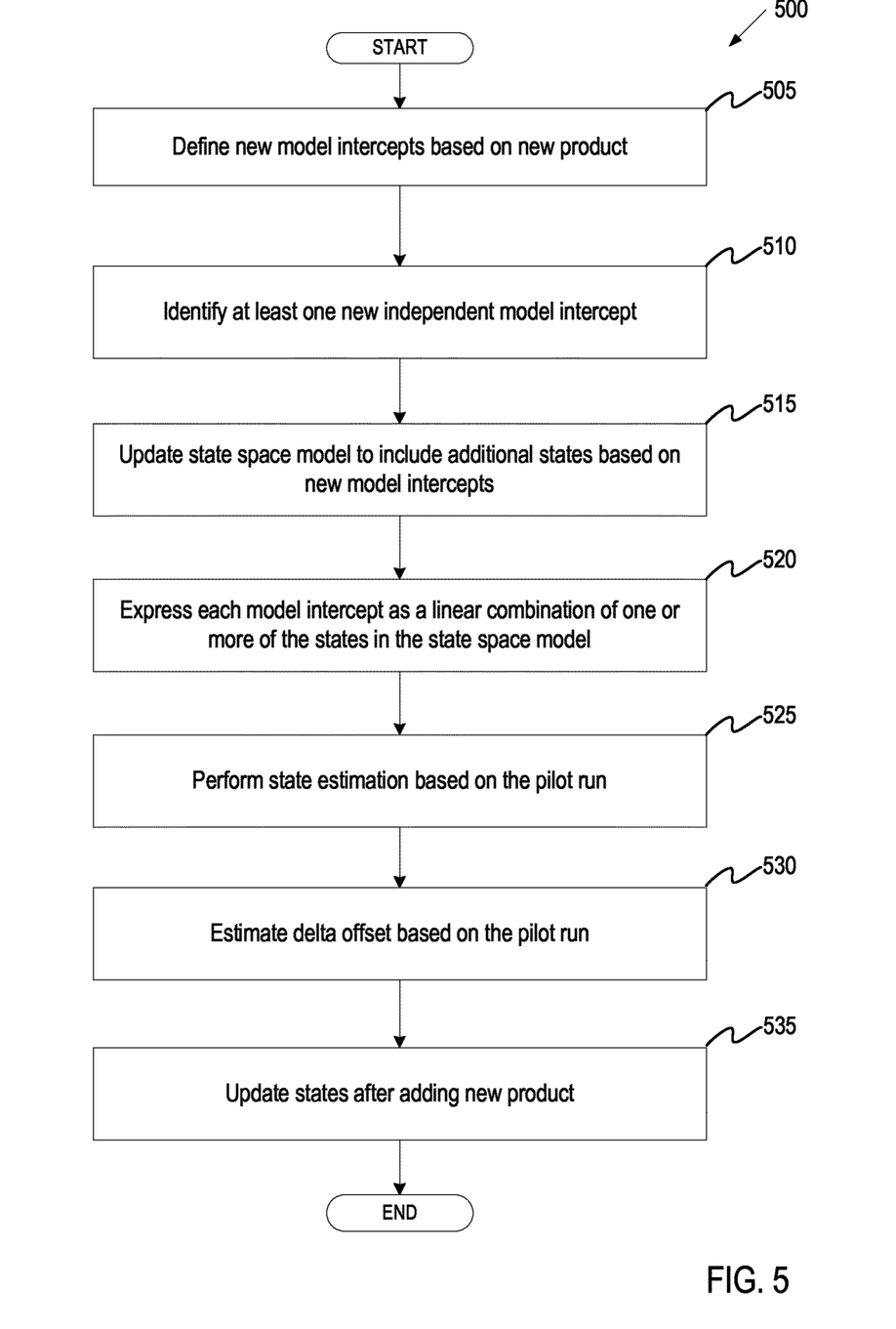
FIG. 5 illustrates one implementation of a method for updating a state space model based on a pilot run performed after a new product is added to a manufacturing facility.

FIG. 5 is a flow diagram illustrating one implementation of a method 500 for updating a state space model based on a pilot run performed after a new product is added to a manufacturing facility. Method 500 can be performed by processing logic that can comprise hardware (e.g., circuitry, dedicated logic, programmable logic, microcode, etc.), software (e.g., instructions run on a processing device), or a combination thereof. In one implementation, method 500 is performed by the pilot run reduction module 120 of manufacturing server 110 of FIG. 1.

At block 505, processing logic defines new model intercepts which includes a context offset based on the new product. For example, for a manufacturing facility with one tool (tool_001), two layers (L_001 and L_002), two reticles (r_001 and r_002), one device (d_001) and a new product (d_002), the new model intercepts $d_{k,i}$ after adding the new product (d_002) will be:

$$d_{k,5} = d_{k,tool\_001} + d_{k,d\_002} + d_{k,L\_001} + d_{k,r\_001}$$

$$d_{k,6} = d_{k,tool\_001} + d_{k,d\_002} + d_{k,L\_002} + d_{k,r\_001},$$

$$d_{k,7} = d_{k,tool\_001} + d_{k,d\_002} + d_{k,L\_001} + d_{k,r\_002}$$

$$d_{k,8} = d_{k,tool\_001} + d_{k,d\_002} + d_{k,L\_002} + d_{k,r\_002}$$

and the complete set of model intercepts after adding a new product (d_002) will be $$\begin{aligned} d_{k,1} &= d_{k,tool\_001} + d_{k,d\_001} + d_{k,L\_001} + d_{k,r\_001} \\ d_{k,2} &= d_{k,tool\_001} + d_{k,d\_001} + d_{k,L\_002} + d_{k,r\_001} \\ d_{k,3} &= d_{k,tool\_001} + d_{k,d\_001} + d_{k,L\_001} + d_{k,r\_002} \\ d_{k,4} &= d_{k,tool\_001} + d_{k,d\_001} + d_{k,L\_002} + d_{k,r\_002} \\ d_{k,5} &= d_{k,tool\_001} + d_{k,d\_002} + d_{k,L\_001} + d_{k,r\_001} \\ d_{k,6} &= d_{k,tool\_001} + d_{k,d\_002} + d_{k,L\_002} + d_{k,r\_001} \\ d_{k,7} &= d_{k,tool\_001} + d_{k,d\_002} + d_{k,L\_001} + d_{k,r\_002} \\ d_{k,8} &= d_{k,tool\_001} + d_{k,d\_002} + d_{k,L\_002} + d_{k,r\_002} \end{aligned} \Rightarrow \Rightarrow \begin{bmatrix} d_{k,1} \\ d_{k,2} \\ d_{k,3} \\ d_{k,4} \\ d_{k,5} \\ d_{k,6} \\ d_{k,7} \\ d_{k,8} \end{bmatrix} =$$

$$\begin{bmatrix} 1 & 1 & 0 & 1 & 0 & 1 & 0 \\ 1 & 1 & 0 & 0 & 1 & 1 & 0 \\ 1 & 1 & 0 & 1 & 0 & 0 & 1 \\ 1 & 1 & 0 & 0 & 1 & 0 & 1 \\ 1 & 0 & 1 & 1 & 0 & 1 & 0 \\ 1 & 0 & 1 & 0 & 1 & 1 & 0 \\ 1 & 0 & 1 & 1 & 0 & 0 & 1 \\ 1 & 0 & 1 & 0 & 1 & 0 & 1 \end{bmatrix} \begin{bmatrix} d_{k,tool\_001} \\ d_{k,d\_001} \\ d_{k,d\_002} \\ d_{k,L\_001} \\ d_{k,L\_002} \\ d_{k,r\_001} \\ d_{k,r\_002} \end{bmatrix}.$$

At block 510, processing logic identifies at least one new independent model intercepts from the new model intercepts based on the new product. For example, processing logic may identify a new independent model intercept by determining that it cannot be expressed as a linear combination of other model intercepts. Using the above example, adding a new device (d_002) will add an additional independent model intercept to the current state space model. One possible new independent model intercept is $$d_{k,5} = d_{k,tool\_001} + d_{k,d\_002} + d_{k,L\_001} + d_{k,r\_001}.$$

At block 515, processing logic updates the state space model to include an additional state based on the at least one new independent model intercept. In one embodiment, an additional state is included in the state space model. For example, based on the previous example, the states in the updated state space model after device d_002 is added to the manufacturing facility are:

$$\begin{aligned} x_{k,1} &= d_{k,tool\_001} + d_{k,d\_001} + d_{k,L\_001} + d_{k,r\_001} \\ x_{k,2} &= d_{k,tool\_001} + d_{k,d\_001} + d_{k,L\_002} + d_{k,r\_001} \\ x_{k,3} &= d_{k,tool\_001} + d_{k,d\_001} + d_{k,L\_001} + d_{k,r\_002} \\ x_{k,4} &= d_{k,tool\_001} + d_{k,d\_002} + d_{k,L\_001} + d_{k,r\_001} \end{aligned} \Rightarrow \begin{bmatrix} x_{k,1} \\ x_{k,2} \\ x_{k,3} \\ x_{k,4} \end{bmatrix} =$$

$$\begin{bmatrix} 1 & 1 & 0 & 1 & 0 & 1 & 0 \\ 1 & 1 & 0 & 0 & 1 & 1 & 0 \\ 1 & 1 & 0 & 1 & 0 & 0 & 1 \\ 1 & 0 & 1 & 1 & 0 & 1 & 0 \end{bmatrix} \begin{bmatrix} d_{k,tool\_001} \\ d_{k,d\_001} \\ d_{k,d\_002} \\ d_{k,L\_001} \\ d_{k,L\_002} \\ d_{k,r\_001} \\ d_{k,r\_002} \end{bmatrix} = P \begin{bmatrix} d_{k,tool\_001} \\ d_{k,d\_001} \\ d_{k,d\_002} \\ d_{k,L\_001} \\ d_{k,L\_002} \\ d_{k,r\_001} \\ d_{k,r\_002} \end{bmatrix},$$

and the state space model after adding a new product is:

$$\begin{bmatrix} x_{1,k+1} \\ x_{2,k+1} \\ x_{3,k+1} \\ x_{4,k+1} \end{bmatrix} = \begin{bmatrix} x_{1,k} \\ x_{2,k} \\ x_{3,k} \\ x_{4,k} \end{bmatrix} + \begin{bmatrix} 1 & 1 & 0 & 1 & 0 & 1 & 0 \\ 1 & 1 & 0 & 0 & 1 & 1 & 0 \\ 1 & 1 & 0 & 1 & 0 & 0 & 1 \\ 1 & 0 & 1 & 1 & 0 & 1 & 0 \end{bmatrix} w_k, \text{ where } y_k = C_{P,k} \begin{bmatrix} x_{1,k} \\ x_{2,k} \\ x_{3,k} \\ x_{4,k} \end{bmatrix}$$

$$C_P^1 = [1\ 0\ 0\ 0]$$

$$C_P^2 = [0\ 1\ 0\ 0]$$

$$C_P^3 = [0\ 0\ 1\ 0]$$

$$C_P^4 = [-1\ 1\ 1\ 0]$$

$C_{P,k}$ is selected from.

$$C_P^5 = [0\ 0\ 0\ 1]$$

$$C_P^6 = [-1\ 1\ 0\ 1]$$

$$C_P^7 = [-1\ 0\ 1\ 1]$$

$$C_P^8 = [-2\ 1\ 1\ 1]$$

At block 520, processing logic expresses each of the model intercepts as a linear combination of the one or more the states in the state space model. In one embodiment, the linear combination is based on the independent model intercepts. In one embodiment, the linear combination is a linear transformation. In alternate embodiments, other linear combinations can be used without departing from the scope of the present disclosure. Using the previous example, the model intercepts can be expressed as a linear transformation of the states:

$$\begin{aligned} d_{k,1} &= x_{k,1} \\ d_{k,2} &= x_{k,2} \\ d_{k,3} &= x_{k,3} \\ d_{k,4} &= -x_{k,1} + x_{k,2} + x_{k,3} \\ d_{k,5} &= x_{k,4} \\ d_{k,6} &= -x_{k,1} + x_{k,2} + x_{k,4} \\ d_{k,7} &= -x_{k,1} + x_{k,3} + x_{k,4} \\ d_{k,8} &= -2x_{k,1} + x_{k,2} + x_{k,3} + x_{k,4} \end{aligned} \Rightarrow \begin{bmatrix} d_{k,1} \\ d_{k,2} \\ d_{k,3} \\ d_{k,4} \\ d_{k,5} \\ d_{k,6} \\ d_{k,7} \\ d_{k,8} \end{bmatrix} = \begin{bmatrix} 1 & 0 & 0 & 0 \\ 0 & 1 & 0 & 0 \\ 0 & 0 & 1 & 0 \\ -1 & 1 & 1 & 0 \\ 0 & 0 & 0 & 1 \\ -1 & 1 & 0 & 1 \\ -1 & 0 & 1 & 1 \\ -2 & 1 & 1 & 1 \end{bmatrix} \begin{bmatrix} x_{k,1} \\ x_{k,2} \\ x_{k,3} \\ x_{k,4} \end{bmatrix}.$$

At block 525, processing logic performs an estimation of the states (independent model intercepts) based on the pilot run. Processing logic can perform state estimation based on the pilot run by updating states of the space model for the manufacturing facility using an estimation approach, such as a moving horizon estimation, etc. The estimation approach can use a series of measurements observed over time and produces estimates of the states based on the measurements.

At block 530, processing logic estimates a delta offset based on the pilot run. In one embodiment, processing logic estimates the delta offset of the states before and after the new product was added to the manufacturing facility. For example, processing logic estimates the delta offset of the states using the equation:

$$\Delta \hat{d}_k = \hat{y}_k - \hat{y}_{k-1} = C_{P,k}\hat{x}_k - C_{k-1}\hat{x}_{k-1}, \text{ where}$$

$C_{k-1}$ is a coefficient matrix corresponding to the system before the new product was added, and $C_{P,k}$ is coefficient matrix after the new product was added to the system.

At block 535, processing logic updates the states for the state space model based on the estimated delta offset after the new product is added to the manufacturing facility. Processing logic can update the states for the space state model by adding the delta offset to each state associated with the new product and keeping all other states unchanged. Processing logic can update the composite states based on the delta offset using alternate computations without departing from the scope of the present disclosure. Using the states and the delta offset from the above example, the new estimated states after adding a new product will be:

$$\hat{x}_{0,k} = \hat{x}_{0,k-1}$$

$$\hat{x}_{1,k} = \hat{x}_{1,k-1}$$

$$\hat{x}_{2,k} = \hat{x}_{2,k-1}.$$

$$\hat{x}_{3,k} = \hat{x}_{3,k-1}$$

$$\hat{x}_{4,k} = \Delta \hat{d}_k$$

Figure 6:
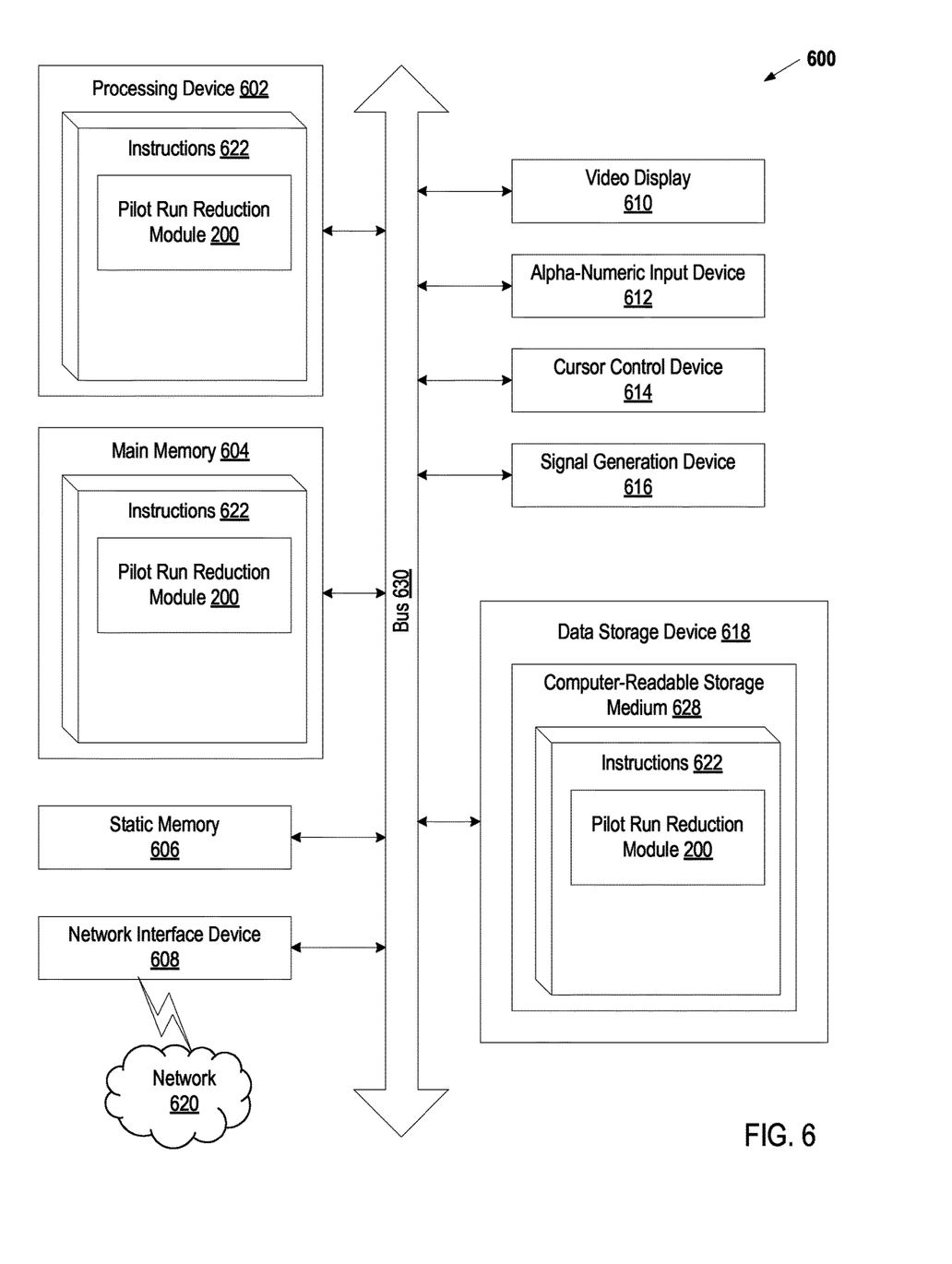
FIG. 6 illustrates an example computer system.

FIG. 6 is a block diagram illustrating an example computing device 600. In one implementation, the computing device corresponds to a computing device hosting a pilot run reduction module 200 of FIG. 2. The computing device 600 includes a set of instructions for causing the machine to perform any one or more of the methodologies discussed herein. In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer device 600 includes a processing system (processing device) 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute the pilot run reduction module 200 for performing the operations and steps discussed herein.

The computing device 600 may further include a network interface device 608. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable storage medium 628 on which is stored one or more sets of instructions (instructions of pilot run reduction module 200) embodying any one or more of the methodologies or functions described herein. The pilot run reduction module 200 may also reside, completely or at least partially, within the main memory 604 and/or within the processing device 602 during execution thereof by the computing device 600, the main memory 604 and the processing device 602 also constituting computer-readable media. The pilot run reduction module 200 may further be transmitted or received over a network 620 via the network interface device 608.

While the computer-readable storage medium 628 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, transitory computer-readable storage media, including, but not limited to, propagating electrical or electromagnetic signals, or may be non-transitory computer-readable storage media including, but not limited to, volatile and non-volatile computer memory or storage devices such as a hard disk, solid-state memory, optical media, magnetic media, floppy disk, USB drive, DVD, CD, media cards, register memory, processor caches, random access memory (RAM), etc.

In the above description, numerous details are set forth. It will be apparent, however, to one of ordinary skill in the art having the benefit of this disclosure, that implementations of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "selecting," "applying," "determining," "performing," or the like, refer to the actions and processes of a computing device, or similar electronic computing device, that manipulates and transforms data represented as physical (e.g., electronic) quantities within the computer system's registers and memories into other data similarly represented as physical quantities within the computer system memories or registers or other such information storage devices.

Implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
calculating, using a processing device, an unbiased estimation of a plurality of independent model intercepts based on a state space model associated with a manufacturing facility;
determining whether to perform a pilot run in the manufacturing facility;
upon determining that the pilot run is to be performed, generating an indication that the pilot run is to be performed;
receiving pilot run data in response to the pilot run being performed;
estimating a delta offset, corresponding to equipment maintenance, for each of the plurality of independent model intercepts, wherein each delta offset corresponds to a difference in the delta offset's respective independent model intercept before and after equipment maintenance was performed, wherein the equipment maintenance was performed after the unbiased estimate of the plurality of independent model intercepts was calculated and before the pilot run was performed; and
updating a state of the state space model based on the received pilot run data and on the estimated delta offsets.

2. The method of claim 1, wherein calculating the unbiased estimation of the independent model intercepts comprises:
determining a number of the plurality of independent model intercepts based on a number of contexts and a number of context values, wherein each of the plurality of independent model intercepts is a summation of context offsets;
determining a plurality of model intercepts based on a process model, wherein each of the plurality of model intercepts is stored in a memory as a linear combination of independent model intercepts; and
generating the state space model based on the linear combinations of independent model intercepts and the context values.

3. The method of claim 2, further comprising:
determining that a new product has been added to the manufacturing facility;
determining a new independent model intercept corresponding to the new product, wherein the new independent model intercept corresponds to a new state; and
updating the state of the state space model to include the new state.

4. The method of claim 3, further comprising:
performing a state estimation based on the received pilot run data; and
estimating a first delta offset based on the received pilot run data, wherein the first delta offset is a difference in an independent model intercept before and after the new product was added; and
updating the state of the state space model based on the first delta offset.

5. The method of claim 1, wherein the indication that the pilot run is to be performed is a signal transmitted to the manufacturing facility.

6. A system comprising:
a memory; and
a processing device operatively coupled to the memory, wherein the processing device is to:

calculate an unbiased estimation of a plurality of independent model intercepts based on a state space model associated with a manufacturing facility;

determine whether to perform a pilot run in the manufacturing facility;

generate an indication that the pilot run is to be performed upon determining that the pilot run is to be performed;

receive pilot run data in response to the pilot run being performed;

estimate a delta offset, corresponding to equipment maintenance, for each of the plurality of independent model intercepts, wherein each delta offset corresponds to a difference in the delta offset's respective independent model intercept before and after equipment maintenance was performed, wherein the equipment maintenance was performed after the unbiased estimate of the plurality of independent model intercepts was calculated and before the pilot run was performed; and update a state of the state space model based on the received pilot run data and on the estimated delta offsets.

7. The system of claim 6, wherein the processing device is further to:

determine a number of the plurality of independent model intercepts based on a number of contexts and a number of context values, wherein each of the plurality of independent model intercepts is a summation of context offsets;

determine a plurality of model intercepts based on a process model, wherein each of the plurality of model intercepts is stored in a memory as a linear combination of independent model intercepts; and generate the state space model based on the linear combinations of independent model intercepts and the context values.

8. The system of claim 7, wherein the processing device is further to:

determine that a new product has been added to the manufacturing facility;

determine a new independent model offset corresponding to the new product, wherein the new independent model offset corresponds to a new state; and update the state of the state space model to include the new state.

9. The system of claim 8, wherein the processing device is further to:

perform a state estimation based on the received pilot run data; and estimate a first delta offset based on the received pilot run data, wherein the first delta offset is a difference in an independent model intercept before and after the new product was added; and update the state of the state space model based on the first delta offset.

10. The system of claim 6, wherein the indication that the pilot run is to be performed is a signal transmitted to the manufacturing facility.

11. A non-transitory computer-readable storage medium having instructions stored thereon which, when executed by a processing device, cause the processing device to:

calculate an unbiased estimation of a plurality of independent model intercepts based on a state space model associated with a manufacturing facility;

determine whether to perform a pilot run in the manufacturing facility;

upon determining that the pilot run is to be performed, generate an indication that the pilot run is to be performed;

receive pilot run data in response to the pilot run being performed;

estimate a delta offset, corresponding to equipment maintenance, for each of the plurality of independent model intercepts, wherein each delta offset corresponds to a difference in the delta offset's respective independent model intercept before and after equipment maintenance was performed, wherein the equipment maintenance was performed after the unbiased estimate of the plurality of independent model intercepts was calculated and before the pilot run was performed; and update a state of the state space model based on the received pilot run data and on the estimated delta offsets.

12. The non-transitory computer-readable storage medium of claim 11, wherein to calculate the unbiased estimation of the independent model intercept, the processing device is further to:

determine a number of the plurality of independent model intercepts based on a number of contexts and a number of context values, wherein each of the plurality of independent model intercepts is a summation of context offsets;

determine a plurality of model intercepts based on a process model, wherein each of the plurality of model intercepts is stored in a memory as a linear combination of independent model intercepts; and generating the state space model based on the linear combinations of independent model intercepts and the context values.

13. The non-transitory computer-readable storage medium of claim 12, wherein the processing device is further to:

determine that a new product has been added to the manufacturing facility;

determine a new independent model offset corresponding to the new product, wherein the new independent model offset corresponds to a new state; and update a state of the state space model to include the new state.

14. The non-transitory computer-readable storage medium of claim 13 storing further instructions, wherein the processing device is further to:

perform a state estimation based on the received pilot run data; and estimate a first delta offset based on the received pilot run data, wherein the first delta offset is a difference in an independent model intercept before and after the new product was added; and update a state of the state space model based on the first delta offset.

15. A method comprising:

calculating, using a processing device, an unbiased estimation of a plurality of independent model intercepts, wherein the calculating comprises:

determining a number of the plurality of independent model intercepts based on a number of contexts and a number of context values, wherein each of the plurality of independent model intercepts is a summation of context offsets;

determining a plurality of model intercepts based on a process model, wherein each of the plurality of model intercepts is stored in a memory as a linear combination of independent model intercepts; and generating a state space model based on the linear combinations of independent model intercepts and the context values;
determining whether to perform a pilot run in a manufacturing facility;
upon determining that the pilot run is to be performed, generating an indication that the pilot run is to be performed;
receiving pilot run data in response to the pilot run being performed;
determining that a new product has been added to the manufacturing facility;
determining a new independent model intercept corresponding to the new product, wherein the new independent model intercept corresponds to a new state;
performing a state estimation based on the received pilot run data;
estimating a first delta offset based on the received pilot run data, wherein the first delta offset is a difference in an independent model intercept before and after the new product was added; and
updating a state of the state space model based on one or more of the received pilot run data, the new state, or the first delta offset.

* * * * *